US008794642B2

(12) United States Patent
Musselman

(10) Patent No.: US 8,794,642 B2
(45) Date of Patent: Aug. 5, 2014

(54) STAMPED DUAL SNOWMOBILE RUNNER AND METHOD OF MANUFACTURE

(71) Applicant: Robert Musselman, Midland, MI (US)

(72) Inventor: Robert Musselman, Midland, MI (US)

( * ) Notice: Subject to any disclaimer, the term of this patent is extended or adjusted under 35 U.S.C. 154(b) by 0 days.

(21) Appl. No.: 13/742,396

(22) Filed: Jan. 16, 2013

(65) Prior Publication Data
US 2014/0042720 A1 Feb. 13, 2014

Related U.S. Application Data

(62) Division of application No. 13/365,489, filed on Feb. 3, 2012, now Pat. No. 8,490,984, which is a division of application No. 12/927,154, filed on Nov. 8, 2010, now abandoned, which is a division of application No. 12/283,202, filed on Sep. 10, 2008, now Pat. No. 7,857,326, which is a division of application No. 11/027,448, filed on Jan. 3, 2005, now Pat. No. 7,481,437.

(51) Int. Cl.
B62B 17/02 (2006.01)

(52) U.S. Cl.
USPC ............... 280/28; 280/845; 29/557; 180/182

(58) Field of Classification Search
USPC ............ 280/28, 28.16, 845, 11.12; 180/182; 29/429, 879.2, 525.08, 557; 72/2, 72/379.4
See application file for complete search history.

(56) References Cited

U.S. PATENT DOCUMENTS

| | | | | |
|---|---|---|---|---|
| 2,957,226 A * | 10/1960 | Dibner | ............................. | 29/874 |
| 3,643,978 A * | 2/1972 | Westberg | ......................... | 280/28 |
| 3,718,341 A * | 2/1973 | Westberg | ......................... | 280/28 |
| 3,844,367 A | 10/1974 | Flohr | | |
| 3,857,578 A * | 12/1974 | Alton | ............................... | 280/28 |
| 3,942,812 A * | 3/1976 | Kozlow | ........................... | 280/28 |
| 4,077,639 A * | 3/1978 | Reedy | .............................. | 280/28 |
| D257,052 S * | 9/1980 | Schrishuhn, Jr. | ............ | D21/766 |
| 4,869,336 A * | 9/1989 | Nakasaki et al. | .............. | 180/196 |
| 5,443,278 A * | 8/1995 | Berto | ................................ | 280/28 |
| 5,700,020 A * | 12/1997 | Noble | .............................. | 280/28 |
| 7,090,229 B2 * | 8/2006 | Monsrud et al. | ................ | 280/28 |
| 7,275,751 B2 * | 10/2007 | Simmons et al. | ............... | 280/28 |
| 2003/0024751 A1 * | 2/2003 | Lebreux | ........................ | 180/182 |
| 2004/0160026 A1 * | 8/2004 | Lund | ................................ | 280/28 |
| 2004/0227312 A1 * | 11/2004 | Dick et al. | ...................... | 280/28 |

* cited by examiner

Primary Examiner — J. Allen Shriver, II
Assistant Examiner — Steve Clemmons

(57) ABSTRACT

A runner and method of making a runner for mounting on a snow ski including a runner body fabricated of one piece of stamped metal which includes a central base portion and a pair of longitudinally extending runner portions which are bent downwardly from the base portions in laterally spaced relationship to one another. Carbide wear strips are secured to the lower edges of the runner portions, while the base portion 18 is fitted with mounting structure 48 which extends upwardly from the base portion and does not extend into the channel 36. The mounting structure 48 may be formed as one piece with the runner body 16 of the same material, has one or more tab features, and may be threaded and/or pierced to accommodate an associated net or mounting pin as desired for mounting the runner.

6 Claims, 5 Drawing Sheets

STAMPED DUAL SNOWMOBILE RUNNER AND METHOD OF MANUFACTURE

This application is a divisional application claiming priority from U.S. patent application Ser. No. 13/365,489, filed Feb. 3, 2012, which is a divisional application of U.S. patent application Ser. No. 12/927,154, filed Nov. 8, 2010, abandoned, which is a divisional application of U.S. patent application Ser. No. 12/283,202, filed Sep. 10, 2008, now U.S. Pat. No. 7,857,326, which is a divisional application of U.S. patent Ser. No. 11/027,448, filed Jan. 3, 2005, now U.S. Pat. No. 7,481,437.

This invention relates generally to replaceable runners for snowmobile skis, and to methods of making such runners, and more particularly to runners having dual running edges.

BACKGROUND OF THE INVENTION

Related Art

It is common in the field of performance snowmobiling to outfit the skis of the snowmobile with wear bars or runners in order to improve the steering traction and wear of the ski and thus handling of the snowmobile. The typical traction bar used in performance racing of snowmobiles is constructed from a length of steel rod that serves as the body of the traction bar. A pair of threaded studs are welded to the top or non-terrain contacting side of the bar and are received in associated mounting holes provided in the skis to enable the wear bar to be removably mounted on the skis by corresponding fastener nuts. An opposite lower terrain contacting side of the wear bar is typically formed to include a channel in which a wear strip of carbide material is metallurgically bonded to present a, wear-resistant traction strip extending lengthwise of the ski, and acting to bite into the terrain to provide enhanced traction and steerability, particularly on icy terrain.

One draw back to the use of such wear bars is the weight which they add to the snow machine. Additionally, there is relatively high cost involved in the prior art manufacturing process which is labor intensive in that the mounting studs need to be welded to the bar and a slot machined in the lower terrain contacting surface of the bar to receive the carbide wear strip.

Traction-enhancing wear bars are also beneficial to recreational snowmobilers. In the non-performance category, the configuration of the wear strips is less restrictive than that for competitive racing. For example, recreational traction bars can include dual runners so that each ski includes a pair of spaced, longitudinally extending traction strips instead of just one per ski. There are several examples of dual runner traction systems in the snowmobile art including U.S. Pat. No. 3,718,341 which shows a generally U-shaped saddle piece used in conjunction with a conventional wear bar to enhance traction; U.S. Pat. No. 3,844,367 which, again, shows a generally U-shaped dual runner traction plate used in conjunction with a conventional wear bar; and U.S. published application no. 2003/0024751 which shows an H-shaped dual runner traction bar fabricated by welding a set of side plates to a central mounting plate and then drilling a series of holes in the central mounting plate to receive fasteners extended upwardly from a lower underside channel of the wear bar into support structure of the ski. The multi-panel fabrication technique is costly and adds additional steps to the manufacture of such runners.

A runner constructed according to the present invention overcomes or greatly minimizes the deficiencies of the foregoing prior art structures.

SUMMARY OF THE INVENTION

A runner constructed according to a presently preferred embodiment of the invention includes a runner body fabricated of one piece stamped metal having a central base portion extending longitudinally between opposite and longitudinal ends and laterally between opposite sides, and including a pair of longitudinally extending runner portions provided along the laterally opposite sides and fabricated of the same one-piece stamped metal as that of the base portion and fixed to the base portion by intervening bent portions of the runner body such that the runner portions project downwardly and terminate at lower free edges and define a generally U-shaped channel on the underside of the runner body. The runner further includes mounting structure secured to the runner body in spaced relation to the U-shaped channel operative to mount the runner body on the underside of the snowmobile ski. The invention also provides a method for forming such a runner in which the mounting structure is kept free of the U-shaped channel of the one-piece runner body.

The invention has the advantage of maintaining the underside open channel of the one-piece runner body free of any mounting structure which could otherwise serve to entrap rocks and other debris within the channel or damage the mounting hardware, thereby impairing the performance of the dual runner system.

A further advantage of the present invention is a one-piece wear bar and mount which is lightweight, structurally sound, and relatively inexpensive to manufacture.

The invention has the further advantage of simplifying the manufacture of such runners by eliminating the need to extend the mounting structure into the open shaped channel of a one-piece U-shaped runner body.

According to a further aspect of the invention, carbide wear strips may be joined to lower free edges of the runner portions, and the carbide wear strips may further be staggered in the longitudinal direction of the runner body so as to further prevent rocks and debris from becoming entrapped within the runner channel on account of the wear strips, as might occur if the wear strips were arranged opposite one another across the channel.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
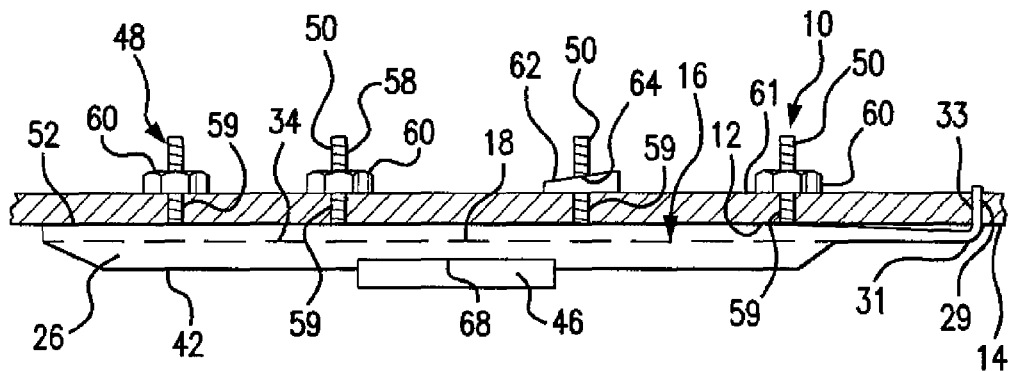
FIG. 1 is a sectional side elevation view of a runner shown mounted on a ski, taken along the section line 1-1 of FIG. 3.
Figure 2:
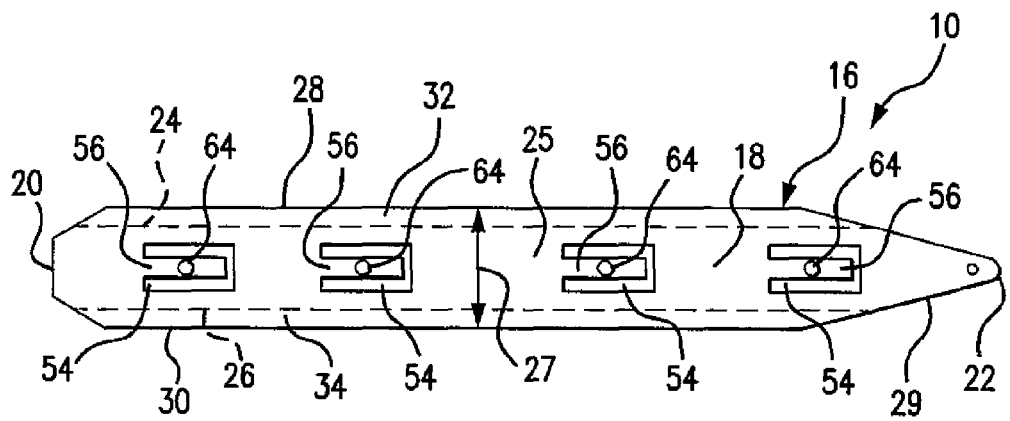
FIG. 2 is a plan view of the runner of FIG. 1 in a stage of manufacture.
Figure 3:
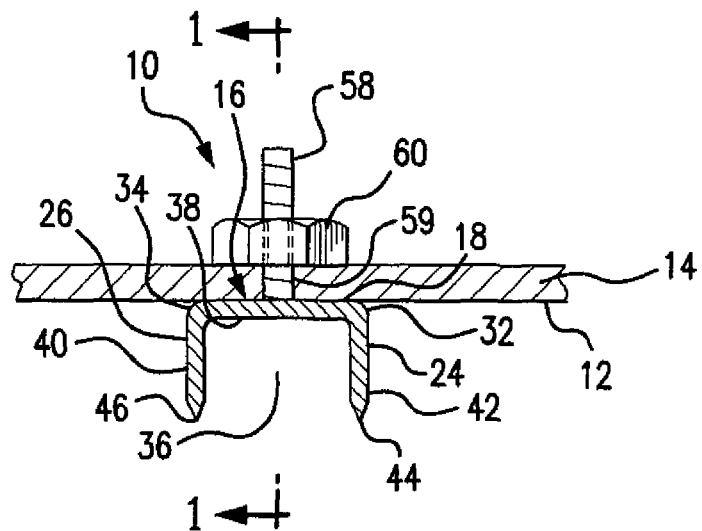
FIG. 3 is an enlarged sectional view taken generally along lines 3-3 of FIG. 1.

A traction increasing runner 10 made according to a first presently preferred embodiment of the invention is shown generally at 10 in FIGS. 1-8, and is illustrated in FIGS. 1 and 3 as being mountable to an underside 12 of a snowmobile ski 14, as it would be mounted in use.

The runner 10 includes a runner body 16 having a central base portion 18 extending between opposite longitudinal ends 20 and 22, respectively, and a pair of longitudinally extending, laterally spaced runner portions 24, 26 provided along laterally opposite sides 28, 30, respectively, of the base portion 18. The base portion 18 includes a rearward base portion 25 having a predetermined width 27 and a forwardly projecting nose 29 of a substantially lesser width and which is upwardly bent at 31 to be received in a forward aperture 33 provided in the ski 14. According to the invention, the base portion 18 and runner portions 24, 26 are fabricated from a single, one-piece stamped metal piece, such that the runner portions 24, 26 are joined to the opposite sides 28, 30 of the base portion 18 by intervening bent portions 32, 34. As shown best in FIGS. 3 and 4, the runner portions 24, 26 extend transversely downwardly from the base portion 18, providing the runner body 16 with a generally U-shaped cross-sectional profile, defining an open U-shaped channel 36 on an underside 38 of the runner body 16. The runner portions 24, 26 terminate at lower free edges 40, 42 to which wear-resistant carbide wear strips 44, 46 are attached along at least a portion of the length of the free edges 40, 42 as will be explained in greater detail below.

The runner body 16 is provided with mounting structure 48 that extends upwardly from the base portion 18 and is operative to mount the runner 10 to the underside 12 of the ski 14. According to the first embodiment, the mounting structure 48 is fabricated of one piece with the runner body 16 out of the same material. As shown best in FIGS. 2 and 4, the mounting structure 48 according to this first embodiment may comprise bent tab portions 50 which are fabricated of the same one piece material as that of the runner body 16 and which are cut out of the base portion 18 and then bent upwardly from an upper surface 52 of the base portion 18 so as to project in a direction opposite the runner portions 24, 26. As shown best in FIGS. 2 and 4, the tab portions 50 may be made by concurrently stamping a U-shaped cut 54 through the base portion at the locations of the tab portions or regions 50 to isolate the material within the U-shaped cut 54 while remaining attached at a base end 56 of the tab portions 50 so as to remain one piece with the runner body 16.

The tab portions or regions 50 are preferably rectangular and may have laterally outer edges 51 and 53 formed with screw threads 58 in order to accommodate a fastener nut 60 when inserted through apertures 59 provided in the ski 14, as in FIG. 1. Alternatively, or in addition to the screw threads 58, the tab portions 50 may be formed with a hole or opening 64 or other feature to receive a pin or wedge for mounting the runner 10 on the ski 14. FIG. 1 illustrates one of the tab portions 50 fitted with such a pin or wedge 62 passing through the hole or opening 64 to pin or wedge the runner 10 to the underside 12 of the ski 14, either in lieu of or in cooperation with the nuts 60 of other tab portions 50. The invention contemplates that the tab portions 50 can be either threaded, provided with the pin opening 64, or both to provide the user with different mounting options. In both instances, the tab portions 50 are nonetheless formed as one piece with the runner body 16 out of the same material as that of the runner body 16. Also, the invention contemplates that while the tab portions 50 project generally upwardly from the runner body 16 away from the runner portions 24, 26, the tab portions 50 may not be necessarily perpendicular to the upper surface 52 of the base portion 18, but could be arranged at an angle or have some shape other than that of the straight up configuration shown in FIG. 1. In any regard, the mounting structure 48 does not extend into the open channel 36 and in this way keeps the channel 36 free from any obstruction by the mounting structure 48, so as not to entrap rocks and other debris that may enter the channel and otherwise become caught on the mounting structure if it were to extend into the channel 36.

The Method of Fabricating

The manufacture of the runner body 16 begins with a flat sheet 66 of stock material. The stock material may be fabricated of steel, such as a low carbon plain steel like SAE 1018, or could be manufactured from medium (SAE 1045) or high carbon (SAE 1090) steels or spring grade or stainless steel alloys, to name a few, as well as from non-ferrous materials such as aluminum or its alloys.

Figure 7:
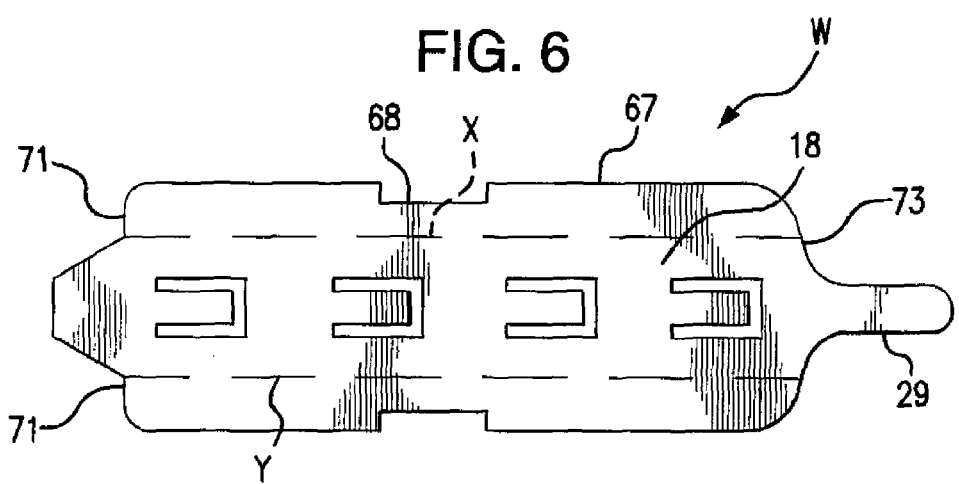
FIG. 7 is a plan view of a shaped workpiece or runner blank cut from the plate stock of FIG. 5.
Figure 8:
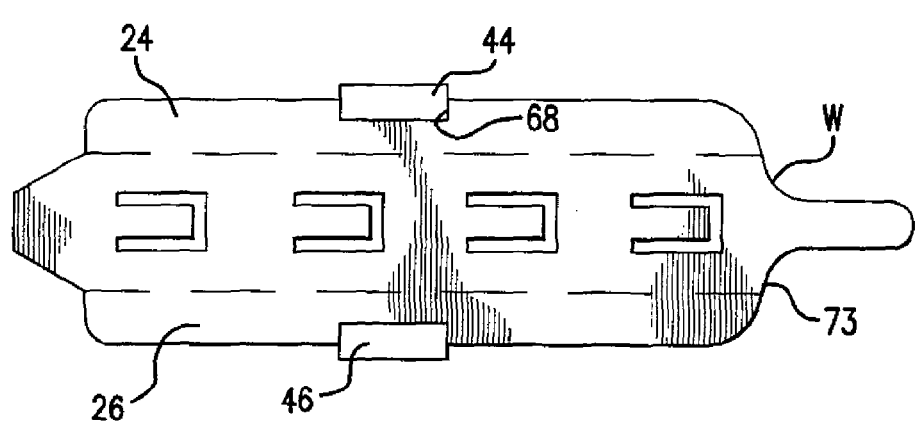
FIG. 8 is a view similar to FIG. 7 but illustrating carbide wear strips joined to the blank prior to bending the blank to the U-shaped configuration.

The flat stock planar material 66 is stamped or cut with a stamping machine having a cutting die with an outline conforming to the outline of the workpiece W to provide the general outline of the interim workpiece W which is subsequently bent to form the runner body 16. The lateral side edges 69 of the workpiece W are cut to include rearward, rearwardly converging edge portions 71 and forward, forwardly converging edge portions 73 which project forwardly to form an integral forward nose or tongue 29 have a substantially reduced width. A plurality of U-shaped cuts 54 may be concurrently stamp cut with the stamp cutting of the workpiece W from the planar sheet 66. Notches 68 may be simultaneously stamp cut in the edges 69 of the stock material 66, as illustrated in FIGS. 5 and 7 in order to provide a location for mounting a strip 44, 46 of hard material, such as carbide, having a hardness substantially greater than the hardness of the metal stock material 66. The carbide wear strips 44, 46, as illustrated in FIG. 8, may be metallurgically secured or bonded by brazing or welding to the stock material 66 while still in sheet form and prior to bending the lateral edges of the downward sheet in opposite direction to form the bent runner portions 24, 26. The invention also contemplates that the carbide strips 44, 46 could be added after the runner portions 24, 26 are bent to the positions illustrated in FIGS. 3 and 4, if so desired. After the carbide wear strips 70 are metallurgically secured to the runners 24, 26, the assembly is quenched in a quenching medium, such as oil, at a predetermined and controlled quench rate to generate a predetermined greater hardness of the workpiece material of between 45 to 65 RC to improve the wearability of the runners 24, 26. The 45 to 65 RC hardness is substantially greater than the initial hardness of the sheet 66 prior to hardening but still substantially less than the yet greater hardness of the carbide wear strips 70. The tabs 50 can be bent upwardly from positions lying in the plane of the base portion 18 to operative, upstanding positions illustrated in FIGS. 1 and 4 before, after or concurrently with the downwardly bending of the legs 24, 26 in opposite directions relative to the base portion 18 but preferably prior to the quenching. The threads 58 can be concurrently stamp cut in the laterally outer edges 51, 53 of tabs 50 when the workpiece W is stamp cut or they can be cut therein after the tabs are swung to the upstanding positions illustrated in FIGS. 1 and 4.

Figure 4:
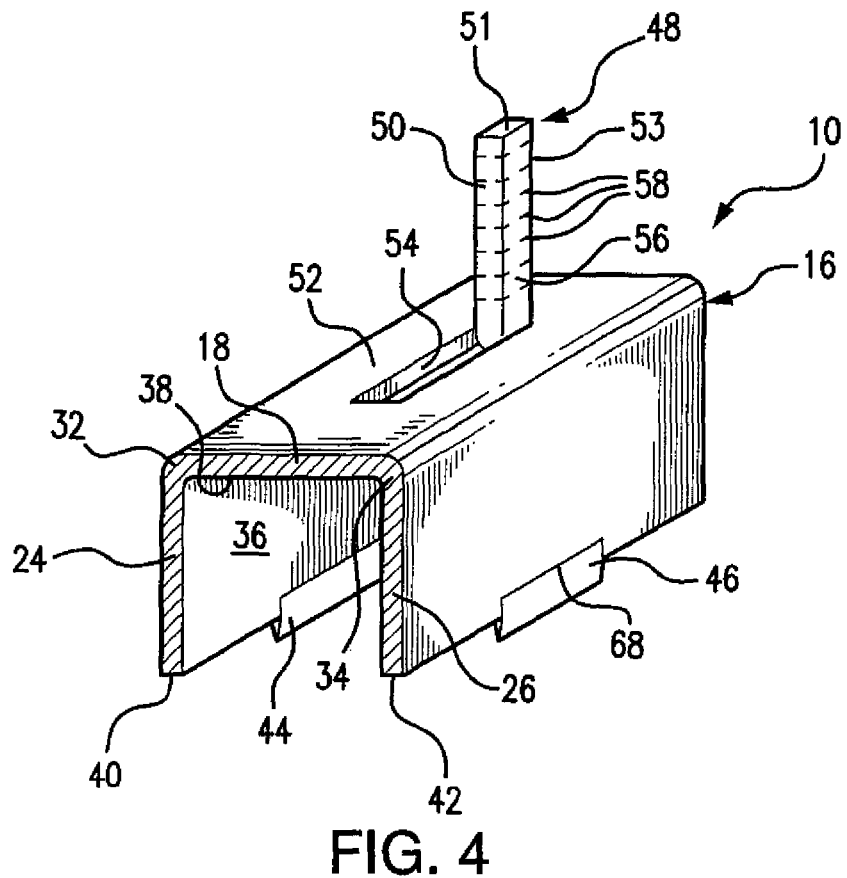
FIG. 4 is a slightly enlarged fragmentary perspective view of the runner of FIG. 2 shown in a stage of manufacture later than that illustrated in FIG. 2.
Figure 5:
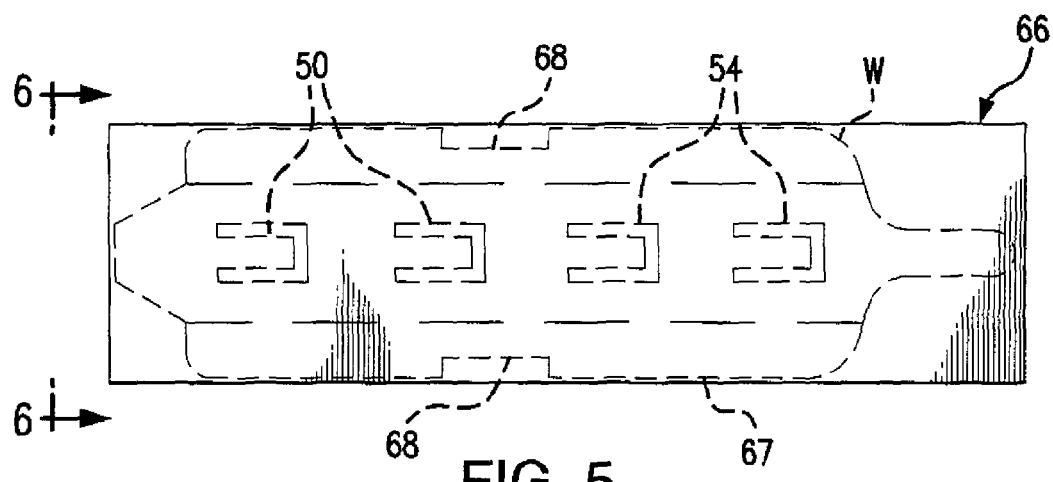
FIG. 5 is a slightly enlarged plan view of a sheet of flat plate stock material from which the one piece runner is stamped along the shape of the workpiece outlined in phantom lines.
Figure 6:
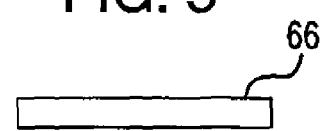
FIG. 6 is an end elevational view, taken along lines 6-6 of FIG. 5.

The laterally opposite runner portions 24, 26 are then bent or folded about fold lines X and Y, respectively, in opposite directions from positions in the plane of the base portion 18 to depending, confronting positions illustrated in FIG. 4 to form the channel 36. The bent portions 32 and 34 are located along the fold lines X and Y. The nose 29 is upwardly bent from a position in the plane of the rear base portion 25 to the upturned position illustrated in FIG. 1 and thereafter, inserted into the front ski aperture 33. The upstanding tab portions 50 are also inserted through the ski aperture 59 so as to project above the upper surface 61 of the ski 14. If the tab portions 50 are threaded, nuts 60 are turned thereon to upwardly force the upper surface 52 of the runner body 16 against the underside 12 of the ski 14. If the tab portions 50 include the hole 64, wedges 62 are inserted in the holes 64 to upwardly wedge the runner 16 against the underside 12 of the ski 14 to minimize snagging of the runner 16 on the terrain.

Figure 10:
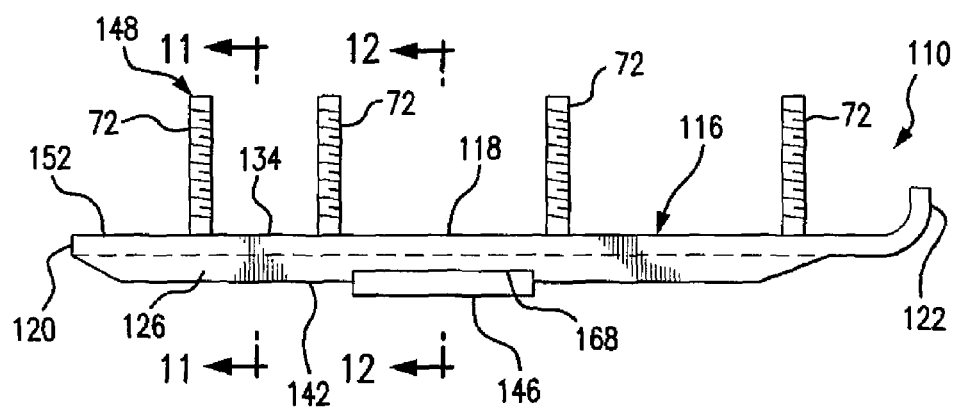
FIG. 10 is a side elevation view of the runner of FIG. 9 with threaded fasteners shown joined to the top side of the runner body.
Figure 11:
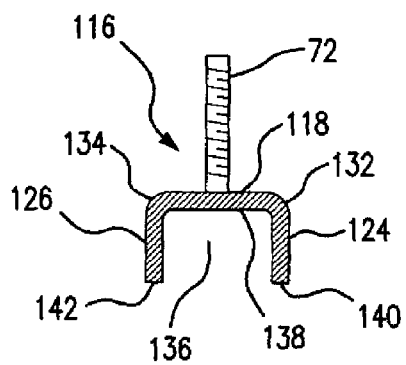
FIG. 11 is an enlarged cross-sectional view taken along section line 11-11 of FIG. 10.

FIG. 3 illustrates a preferred construction of the carbide wear strips 70, in which the strips 44, 46 are no wider than that of the stock material and are relatively shorter in length than the runner portions 24, 26, as illustrated in FIG. 10. The wear strips 70 are preferably joined to the lower edges of the runner portions 24, 26 in the manner described above.

Alternate Embodiment

FIGS. 9-12 illustrate an alternate embodiment of a slightly modified runner wherein the same reference numerals are used to designate like features but are offset by 100.

Figure 9:
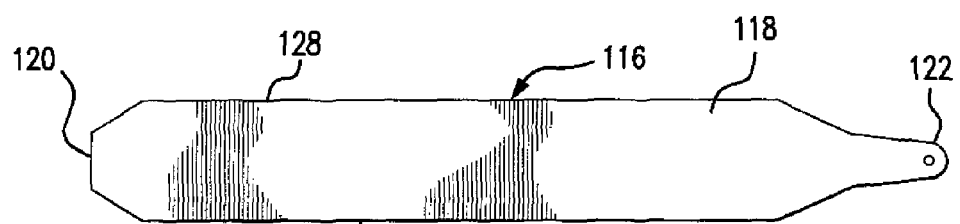
FIG. 9 is a plan view of an alternative embodiment of a slightly modified runner illustrated in FIG. 10 following bending but prior to installation of the mounting fasteners.

FIG. 9 shows a top view of the stock material 166 following bending of the runner portions 124, 126 relative to the base portion 118. It is noted that the tab portions described previously are omitted in favor of threaded studs 72, shown in FIGS. 10-12, which can be welded to the top surface 152 of the base portion 118 at the appropriate locations to enable the runner body 16 to be mounted on the ski. As with the tab portions 50, the threaded studs 72 do not project into the channel 136 and thus maintain the channel 136 free of any of the mounting structure 148.

Figure 12:
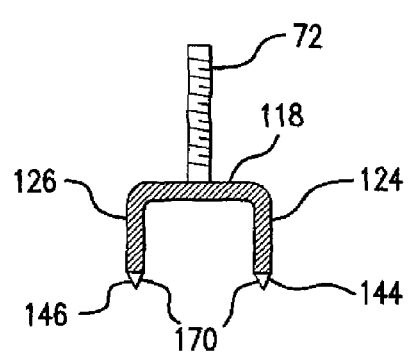
FIG. 12 is an enlarged cross-sectional view taken along line 12-12 of FIG. 10 illustrating the carbide wear rails metallurgically bonded to the notches in the bottom edges of the runner portions.

FIG. 12 illustrates the construction of the carbide wear strips 170, in which the strips 144, 146 are no wider than that of the stock material and are relatively shorter in length than the runners 144, 146, as illustrated in FIG. 10. The wear strips 170 are preferably joined to the lower free edges of the runner portions 124, 126 in the manner described above.

Second Alternate Embodiment

Figure 13:
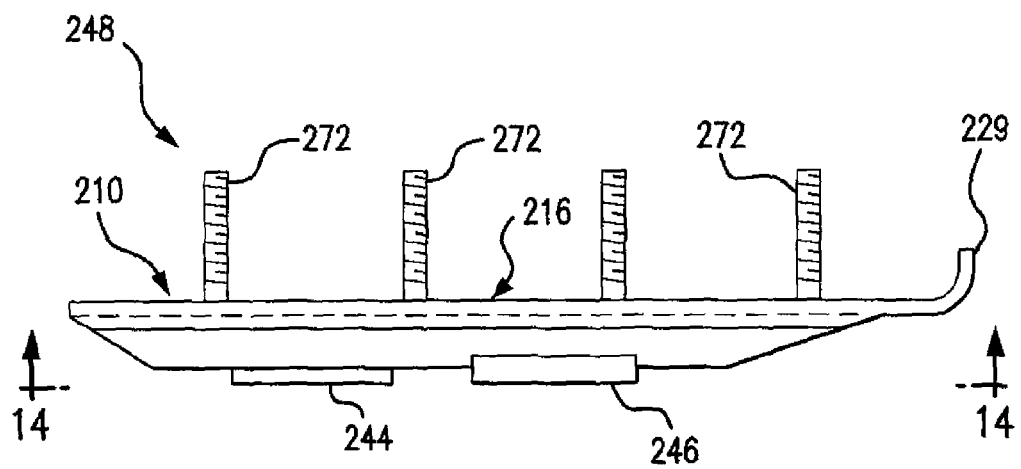
FIG. 13 is a side elevation view of a second alternative embodiment of another slightly modified runner according to the invention.
Figure 14:
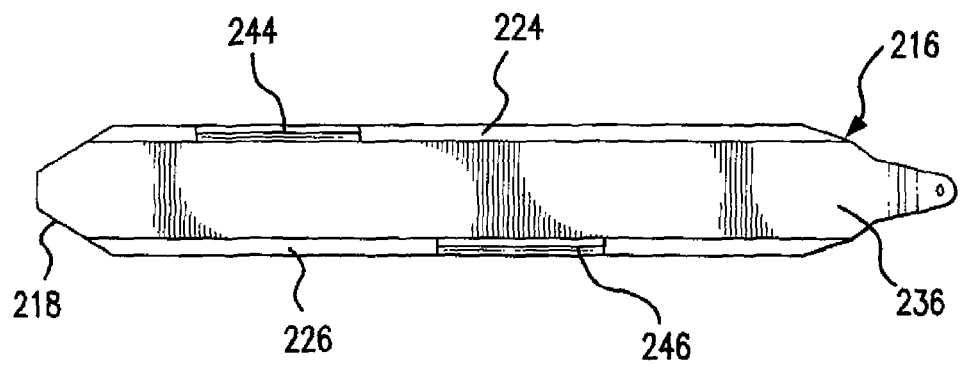
FIG. 14 is a bottom view of the runner of FIG. 13 in the direction of lines 14-14 illustrating the staggered arrangement of the wear strips.

FIGS. 13 and 14 illustrate a second alternative embodiment of a slightly modified runner, wherein the same reference numerals are used to designate like features, but are offset by 200. The runner 210 of FIGS. 13 and 14 includes the one-piece runner body 216 including the base portions 218 and bent runner portions 224, 226. The runner portions 224, 226 are fitted with carbide wear strips 244, 246 which, as illustrated, are longitudinally staggered. As shown in FIG. 14, this staggered relationship is one in which the wear strip 244 on one of the runner portions 224 is laterally misaligned with the wear strip 246 on the opposite runner portion 226. This staggered relationship of the wear strips 244, 246 enables any rocks and debris that may enter the channel 236 to more easily pass by the carbide wear strips 244, 246 without becoming caught or entrapped between the wear strips. For example, a rock entering the channel 236 is able to encounter only one of the wear strips 244, 246 at a time and thus cannot become trapped between them due to their offset relationship.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A method of fabricating a runner for mounting on the underside of a snowmobile ski, comprising:
   stamp cutting a shaped workpiece from a planar sheet of metal having a predetermined hardness, a generally uniform thickness, and upper and lower faces to provide a flat stamped blank having a longitudinally extending central base and laterally opposite side edge portions on laterally opposite sides of said base;
   said stamp cutting step including cutting said laterally opposite side edge portions with curvilinear forward and rearward edge portions extending forwardly and rearwardly, respectively, of an intermediate edge portion;
   said stamp cutting step further including cutting a slot in each of said intermediate edge portions;
   said stamp cutting step including cutting a U-shaped notch in said base to partially separate a mounting tab portion from the base along the notch, and
   bending said mounting tab portion out of the plane of the base;
   folding the laterally edge portion in opposite directions out of the plane of said base to confronting positions on the underside of said base.

2. The method set forth in claim 1 wherein said stamp cutting step includes cutting said slots in longitudinally staggered relation to each other.

3. The method set forth in claim 1 wherein said curvilinear forward edge portions on opposite sides of said base forwardly converge.

4. The method set forth in claim 3 wherein said curvilinear rearward edge portions on opposite sides of said base rearwardly converge.

5. The method set forth in claim 1 including the step of forming mounting portions on said base that projects upwardly from said upper surface of said base.

6. The method set forth in claim 1 further including the step of disposing a hardened wear strip, having a hardness greater than said predetermined hardness, into each of said slots and metallurgically bonding said wear strips in said slots.

* * * * *